May 7, 1929.  H. W. KNIGHT  1,711,796

BOWL FOR FLUID MEASURING PUMPS

Filed Feb. 7, 1928

Inventor.
Harry W. Knight.

Patented May 7, 1929.

1,711,796

UNITED STATES PATENT OFFICE.

HARRY W. KNIGHT, OF TORONTO, ONTARIO, CANADA.

BOWL FOR FLUID-MEASURING PUMPS.

Application filed February 7, 1928. Serial No. 252,652.

The principal objects of this invention are to positively and indelibly mark the graduations upon the glass of measuring bowls for gasolene and other fluid dispensing pumps in such a manner that the level of the fluid may be very accurately determined and so that the measuring means cannot be tampered with or altered.

A still further object is to provide a marking which will not deteriorate and which cannot be obscured by the contents of the bowl.

The principal feature of the invention consists in indelibly marking the graduations on the inner surface of the glass bowl and further, in accentuating the markings by incorporating thereinto an indelible pigment to colour the marking.

In the accompanying drawings, Figure 1 is a perspective view of the measuring bowl of the fluid dispenser.

Figure 4:
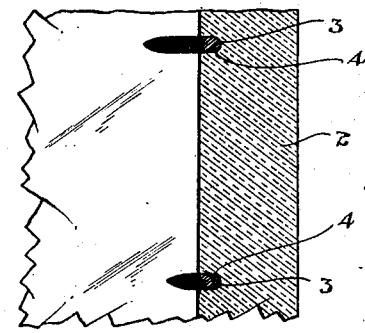
Figure 4 is a very much enlarged and exaggerated sectional view illustrating the method of indelibly colouring the markings.
Figure 1:
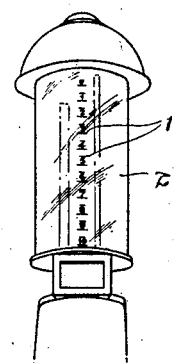
Figure 2:
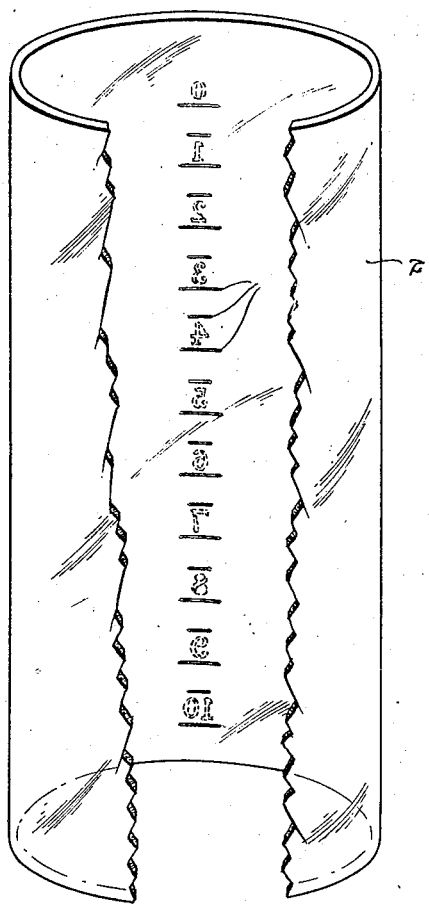
Figure 2 is an enlarged perspective view of the glass bowl partly broken away and showing the graduation markings on the inner face thereof.
Figure 3:
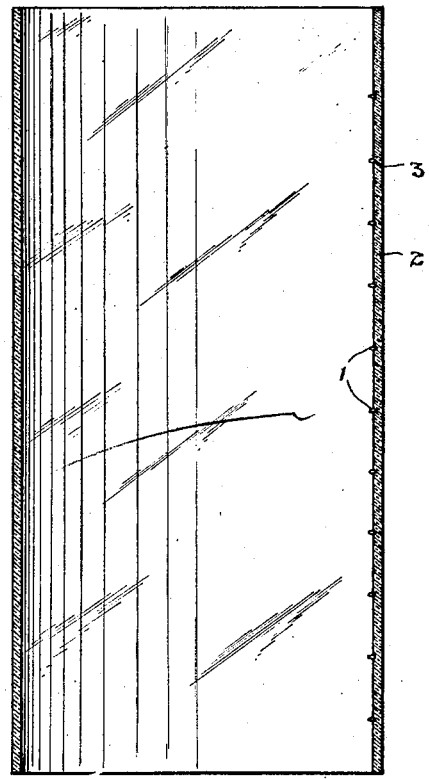
Figure 3 is a longitudinal sectional view of the graduation marking.

The dispensing of gasolene is now being almost exclusively effected from the visible "bowl" type, in which the fluid is pumped into a glass cylinder mounted upon a standard. Various forms of marking devices have been arranged within bowls to mark the levels of the fluid therein representing standard measurements, such as gallons and half-gallons.

A very accurate adjustment of these measuring devices is necessary and they are required to be checked carefully by Government officials and the bowl sealed under the Government seal so that they cannot be tampered with.

Such conditions are objectionable in the handling of the dispensing pumps in moving them from place to place or in their original setting up. Further, many of these devices are subject to corrosion and they become more or less marred and discoloured from contact with the fluid being dispensed and it is frequently difficult for the purchaser of the goods sold therefrom to determine whether an accurate measurement is given or not.

The present invention has been devised to overcome these difficulties and it is accomplished in a very simple manner by marking the graduations 1 on the inner surface of the glass bowl 2. These markings are preferably placed by grinding a thin groove 3 to form a horizontal line in the inner wall of the glass.

The bowls are individually measured and tested so that the markings are placed in accordance with the actual fluid measurement and the line is ground to extreme accuracy and thinness and will show exactly the position of the level of the fluid in the bowl, as the marker is in direct contact with the fluid at the surface of the glass, consequently the purchaser will see the exact position of the fluid level at whatever angle he may be looking.

It is preferable that the markings be coloured to clearly accentuate same and a suitable fusible material 4 is filled into the markings and the bowl is then fired in the usual manner of handling glass ware or pottery to burn the colour and fuse it to the glass surface.

A bowl thus produced is not subject to change and quantities of bowls may be handled at a time by the Government inspector, thus materially reducing the cost.

What I claim as my invention is:

A glass measuring bowl having thin horizontal line markings ground in the inner face thereof, and a colouring fusible material filling the markings and fused thereinto.

HARRY W. KNIGHT.